United States Patent [19]

Duncan

[11] 4,096,370
[45] Jun. 20, 1978

[54] MICROWAVE OVEN DOOR INTERLOCK SWITCH SYSTEM

[75] Inventor: Eliot R. Duncan, Iowa City, Iowa

[73] Assignee: Litton Systems, Inc., Beverly Hills, Calif.

[21] Appl. No.: 806,617

[22] Filed: Jun. 15, 1977

[51] Int. Cl.² .......................... H05B 9/06; H02H 3/00
[52] U.S. Cl. ...................... 219/10.55 C; 219/10.55 B; 337/1; 361/104
[58] Field of Search .................. 219/10.55 C, 10.55 B, 219/10.55 D; 361/104; 307/252 B; 337/1

[56] References Cited

U.S. PATENT DOCUMENTS

| 3,312,863 | 4/1967 | Muldoon | 361/104 X |
| 3,353,066 | 11/1967 | De Souza | 361/104 X |
| 3,624,334 | 11/1971 | Chapell | 219/10.55 C |
| 3,699,300 | 10/1972 | Buerki | 219/10.55 C |
| 3,717,793 | 2/1973 | Peterson | 361/104 |
| 3,761,734 | 9/1973 | Windecker | 361/104 |
| 3,794,811 | 2/1974 | Hehl | 361/104 X |
| 3,816,688 | 6/1974 | Fritts | 219/10.55 C |
| 3,868,552 | 2/1975 | Wickson | 361/104 |
| 3,984,733 | 10/1976 | De Lucia | 219/10.55 C X |

Primary Examiner—Arthur T. Grimley
Attorney, Agent, or Firm—Robert E. Lowe

[57] ABSTRACT

The invention relates to a power supply for microwave ovens and features a fail-safe door interlock switch system. Door interlock switch systems for microwave ovens are designed to stop or interrupt the flow of electrical energy to the magnetron tube upon the opening of the oven door to prevent the escape of microwave energy from the oven cavity through the open oven door. The interlock switch is normally in the power line and malfunctioning can occur in which the power line interlock switch does not open with the opening of the oven door either because of being welded closed or somehow stuck in a closed state. In this invention a fail-safe feature is provided for the interlock system. If a malfunction should cause the interlock power switch to remain closed upon the opening of the oven door, means are present which effectively break the power line to stop the flow of electrical energy to the magnetron tube. Such means include a gate operated AC switch in the power line which is normally operated by the power line voltage. An oven door interlock monitor switch operates to shunt the AC switch in the event that a malfunction prevents the normal opening of the interlock power switch. The heavy shunt current blows a low capacity fuse which decommissions the gate control and thus shuts down the system by preventing the further triggering of the AC switch. The interlock monitor switch is in a low power subcircuit of the system and this feature provides an advantage over the normal "crowbar circuit" in that no surge currents are passed through the circuit.

2 Claims, 1 Drawing Figure

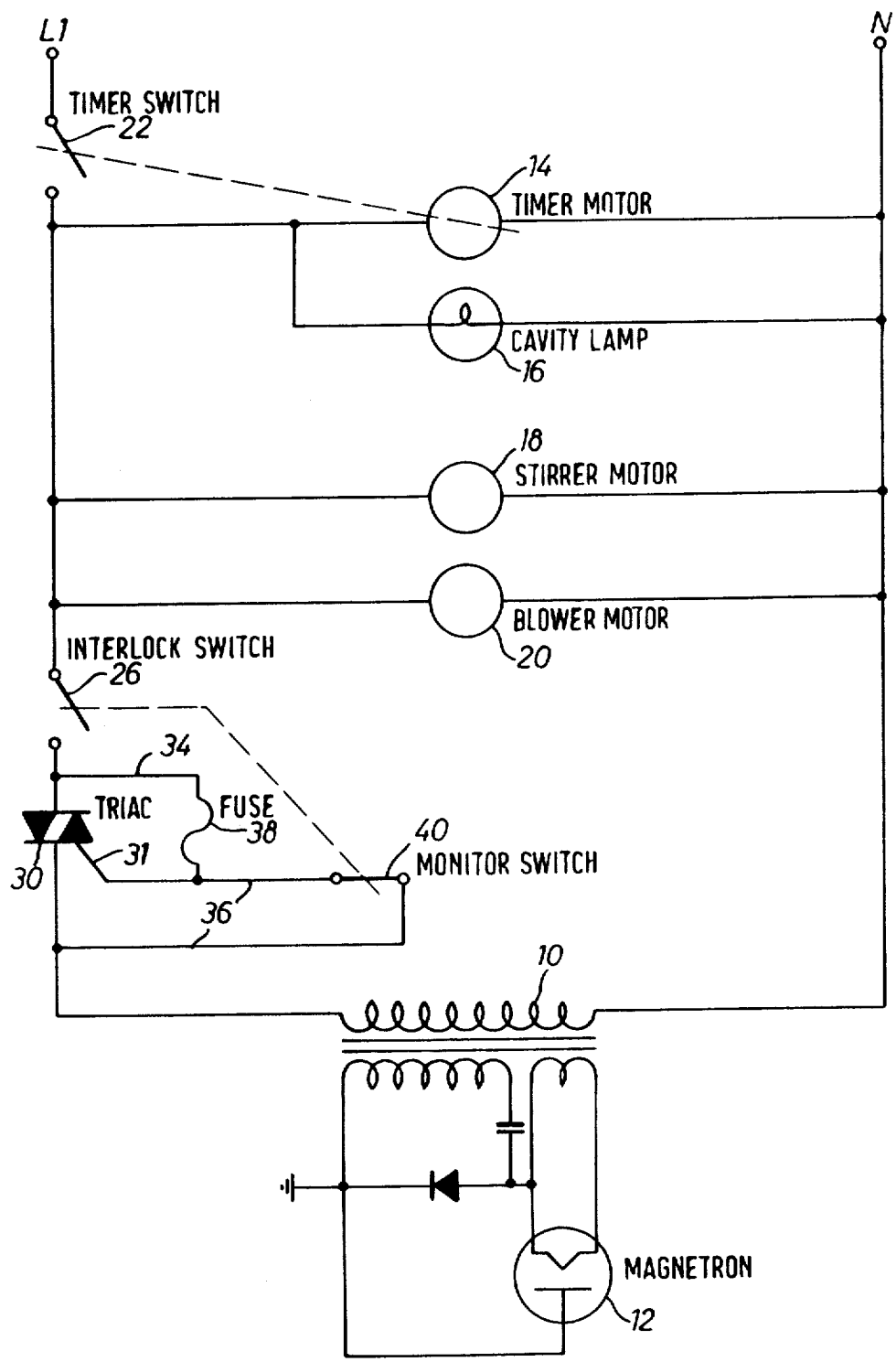

MICROWAVE OVEN DOOR INTERLOCK SWITCH SYSTEM

The invention relates to a power supply for microwave ovens having a new and improved door interlock switch system.

It is conventional for microwave ovens to have oven door interlock switch systems designed to stop or interrupt the flow of electrical energy to the magnetron tube upon the opening of the oven door. The purpose of course is to prevent the escape of microwave energy from the oven cavity through the open oven door.

The interlock switch is normally in the power line. Certain malfunctioning of the interlock system occurs in which the power line interlock switch does not open with the opening of the oven door either because of being welded closed or somehow stuck in a closed state. This malfunctioning permits the above mentioned escape of microwave energy from the oven cavity.

In the present invention a fail-safe feature is provided for the interlock system. In the event that a malfunction should cause the interlock power switch to remain closed upon the opening of the oven door, means are present which effectively break the power line to stop the flow of electrical energy to the magnetron tube. Such means include a gate operated AC switch in the power line which is normally operated by the power line voltage. An oven door interlock monitor switch operates to shunt the AC switch in the event that a malfunction prevents the normal opening of the interlock power switch. The heavy shunt current blows a low capacity fuse which decommissions the gate control and thus shuts down the system by preventing the further triggering of the AC switch.

The interlock monitor switch is in a low power subcircuit of the system and this feature provides an advantage over the normal "crowbar circuit" in that no surge currents are passed through the circuit.

A main object of the invention is to provide a microwave oven power supply having a new and improved fail-safe interlock switch system.

Other objects and advantages of the invention will become apparent from the following specification, drawings and appended claims.

THE DRAWING

The drawing shows a schematic wiring diagram of a circuit embodying the invention for a microwave heating oven.

The illustrated circuit is adapted to be connected between one power line L1 and the neutral conductor N of a standard 220–240 volt 60 Hz. single phase three wire supply network, the voltage between L1 and N being in the range 110–120 volts.

The main or primary load of the circuit is a transformer 10 which powers a high frequency oscillator or magnetron tube 12. Other representative oven components requiring electrical energy and arranged in parallel in the circuit are a timer motor 14, a cavity lamp 16, a field stirrer motor 18 and a blower motor 20. The timer motor 14 operates a timer switch 22 in the power line L1.

Also in power line L1 is an interlock switch 26 which is in the oven door (not shown). During normal operation the interlock switch 26 is only closed when the oven door is closed. This is to insure that the magnetron 12 cannot be energized unless the oven door is securely closed and locked, thereby protecting against the inadvertent escape of microwave energy from the oven cavity.

The above applies during normal operation. A relatively common abnormal condition, however, is that for various reasons it is possible that the interlock switch 26 may become stuck or welded in its closed state and thus not open upon the opening of the oven door.

In order to guard against the detrimental effects of this abnormal condition there is provided a gate operated AC switch 30 in the power line L1 which operates to interrupt the power supply when the interlock switch 26 remains closed despite the opening of the oven door. Although the AC switch 30 is illustrated as a triac type semiconductor thyristor, it may take other forms within the scope of the invention.

The triac 30 has a gate 31. In a subcircuit associated with the triac 30 the triac is operated through a branch line 34 directly from the line voltage. A second branch line 36 is also provided for the subcircuit. Branch lines 34 and 36 connect to the power line L1 on opposite sides of the triac and each of the branch lines is connected to the triac gate 31. Branch line 34 contains a fuse 38 and branch line 36 contains an interlock monitor switch 40. As with the interlock power switch 26, monitor switch 40 is likewise in the oven door. A difference, however, is that monitor switch 40 opens when the oven door is closed and closes when the oven door is opened.

In the normal operation of the circuit the closing of the oven door causes the closing of the power switch 26 and the opening of the monitor switch 40. When the branch 34 does not contain a resistance element, the total conduction angle approaches 360°. The conduction angle is of no special moment relative to the invention, however, and some resistance in branch line 34 which would reduce the conduction angle is of no concern herein.

Only small trigger or gate currents are required for the triac switch 30 and for some triacs such currents may be on the order of 2 to 4 miliamps for normal operation. The minimum rating of the fuse 38 depends on the normal current for branch 34 and may be approximately 10 miliamps, for example, for a normal operating current of 2 to 4 miliamps in branch 34. The maximum rating of the fuse 38 is related to the normal current in the power line L1. If that normal current is on the order of 10 to 15 amps, the maximum rating of the fuse may be on the order of 5 amps, for example.

As an example of abnormal operation, or an operational failure, the opening of the oven door would not also cause the opening of the power switch 26. In the absence of a fail-safety apparatus, the normal operating current of 10 to 15 amps would continue to flow in line L1 causing the continued operation of the magnetron 12 with the oven door open. The fail-safe apparatus herein is the fuse 38 and branch line 36 which contains the door operated monitor switch 40.

The opening of the oven door unerringly causes closing of the monitor switch 40 and if a malfunction would cause the power switch to remain closed, substantially all of the line current would be shunted through branches 34 and 36. This heavy current would immediately blow the preferrably small capacity fuse 38 (10 milliamps, for example) and thus prevent any further triggering of the triac 30.

The fuse 38 would of course have to be replaced but at the same time it would also be necessary to repair or correct the malfunction which prevented opening of the power switch 26 with the opening of the oven door.

I claim:

1. A power supply circuit for a microwave heating oven, comprising, a power line and a neutral line, a transformer between said lines for operating a magnetron tube, an oven door interlock power switch in said power line adapted to normally open and close with the respective opening and closing of the oven door, a gate operated AC switch having a gate in said power line, first and second branch lines extending respectively from the power and neutral sides of said AC switch to said gate, a fuse in said first branch line having suitable minimum and maximum ratings respectively relative to normal gate current in said first branch line and normal line current in said power line, and an oven door interlock monitor switch in said second branch line adapted to normally close and open with the respective opening and closing of the oven door.

2. A power supply circuit according to claim 1 wherein said AC switch is a triac.

* * * * *